(12) United States Patent
Lorenz et al.

(10) Patent No.: US 8,348,334 B2
(45) Date of Patent: Jan. 8, 2013

(54) WATT LINKAGE SUSPENSION DEVICE HAVING INTEGRATED COMPLIANCE AND DAMPING

(75) Inventors: Karl Lorenz, Grosskoschen (DE); Friedhelm Langhorst, Diepholz (DE); Jens Eismann, Melle (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/260,453

(22) PCT Filed: May 20, 2010

(86) PCT No.: PCT/DE2010/050028
§ 371 (c)(1),
(2), (4) Date: Sep. 26, 2011

(87) PCT Pub. No.: WO2010/136028
PCT Pub. Date: Dec. 2, 2010

(65) Prior Publication Data
US 2012/0098296 A1    Apr. 26, 2012

(30) Foreign Application Priority Data
May 27, 2009  (DE) .......................... 10 2009 026 503

(51) Int. Cl.
*B62D 33/10*  (2006.01)
(52) U.S. Cl. .................................. 296/190.07
(58) Field of Classification Search ............. 296/190.01, 296/190.04, 190.07; 180/89.13; 280/124.1, 280/124.106, 124.107, 124.14; 74/103
See application file for complete search history.

(56) References Cited

U.S. PATENT DOCUMENTS

| 6,206,422 B1 * | 3/2001 | Goddard ....................... 280/788 |
| 7,695,054 B2 * | 4/2010 | Haeusler et al. ......... 296/190.07 |
| 7,950,727 B2 * | 5/2011 | Haeusler et al. ......... 296/190.07 |

FOREIGN PATENT DOCUMENTS

| DE | 198 27 329 A1 | 9/1999 |
| DE | 10 2005 043 998 A1 | 4/2007 |
| DE | 10 2008 045 787 A1 | 3/2009 |
| EP | 0 882 641 A2 | 12/1998 |
| EP | 1 764 242 A1 | 3/2007 |
| KR | 10 2004 004 812 0 A | 6/2004 |

\* cited by examiner

*Primary Examiner* — H Gutman
(74) *Attorney, Agent, or Firm* — Davis & Bujold, PLLC

(57) ABSTRACT

A suspension system for the spring or damped suspension of a massive body relative to a substructure. The suspension system comprises a spring/damper arrangement disposed between the massive body and the substructure, which comprises at least one damper element and/or at least one spring element for damping shock and/or vibration, and includes a Watt linkage arrangement with at least one Watt linkage. At least one spring element and/or at least one damper element is arranged in the area of a Watt link between the Watt link and the bearing seat associated with the Watt link.

14 Claims, 4 Drawing Sheets

WATT LINKAGE SUSPENSION DEVICE HAVING INTEGRATED COMPLIANCE AND DAMPING

This application is a National Stage completion of PCT/DE2010/050028 filed May 20, 2010, which claims priority from German patent application serial no. 10 2009 026 503.1 filed May 27, 2009.

FIELD OF THE INVENTION

The invention concerns a suspension system for the spring or shock-absorbing suspension of a massive body relative to a substructure, for example the driver's cabin of a truck relative to the chassis of the vehicle.

BACKGROUND OF THE INVENTION

Suspension systems of the type described above are used, for example but by no means exclusively, in trucks, agricultural vehicles or heavy-load vehicles, in order to decouple the driver's cabin from the vehicle's chassis as much as possible, in each case with regard to vibrations and movements.

Since in heavy-load vehicles the spring and damper characteristics of the spring/damper units of the chassis have to be chosen unavoidably 'hard' on account of the considerably large vehicle weight and because of the large unsprung masses in the chassis, bumpiness of the road or even vibrations from the axles and drive-train are still often transmitted to a considerable extent, via the axle springing, to the chassis and from there also to the driver's cabin.

In the context of ergonomics and work protection for the driver, in order to minimize transmitting such shocks and vibrations to the driver's cabin and thus to the place where the driver works, driver's cabin suspensions have been developed by which the driver's accommodation or cabin is supported on the vehicle chassis by means of a suspension system of its own. Thanks to the much lower mass of the driver's cabin compared with the vehicle, such suspension systems for the driver's cabin can be designed with 'softer' spring characteristics than the axle suspension, and for that reason bumpiness of the road or vibrations coming from the drive-train or axles of the vehicle can be much more effectively isolated from where the driver works, thanks to such comparatively softer cabin suspension systems.

With elastic suspension systems of this type, in order for example to restrict lateral movements or even rolling of the driver's cabin—as when driving on an incline or round a curve, but also for example in the case of road bumps on one side only—suspension systems have been developed in which a spring/damper arrangement and a Watt linkage mechanism is disposed between the driver's cabin and the chassis. Depending on the design, the Watt linkage mechanism ensures that lateral movements of the vehicle's cabin relative to the chassis are suppressed, or that the sprung movements of the cabin relative to the chassis take place essentially linearly, i.e. that the degrees of movement freedom between the cabin and the chassis are restricted by virtue of the Watt linkage mechanism, in particular to vertical spring movements.

For example, such a suspension system is known from DE 10 2005 043 998 A1. Depending on the version concerned, this known suspension system comprises one or more Watt linkages, which ensure that the degree of movement freedom of the cabin relative to the chassis, for example in a truck, is restricted only to a vertical movement, or additionally that rolling movements of the cabin relative to the chassis are prevented. At the same time linear spring movements between the cabin and the chassis along the vertical axis—within the spring deflection range of the cabin—are still possible without restriction.

However, with this known suspension system it is still necessary, in the area of the Watt linkage arrangement, for separate and additional spring/damper elements to be disposed between the cabin and the chassis, since in accordance with the technical principle of the document the Watt linkage or linkages of the Watt linkage mechanism can only carry out guiding functions in relation to the vertical sprung movement, whereas the actual vertical holding forces or damping action during the sprung movement have to be provided by the separate spring/damper elements. Furthermore, for reasons of symmetry and design arrangement the spring/damper elements generally have to be provided in duplicate and are positioned in the area of two corners of the cabin.

This is elaborate and requires a comparatively large number of assemblies and components, which involve corresponding costs, corresponding structural space occupation and corresponding component weights. Besides, the spring/damper elements in the known driver's cabin suspensions are arranged in comparatively exposed positions and therefore have in their own right the need to be protected against damage or dirt during the often harsh day to day operating conditions of a truck.

SUMMARY OF THE INVENTION

Against that background the purpose of the present invention is to provide a suspension system for the spring and damping suspension of a massive body relative to a substructure, in particular for the suspension of a vehicle cabin in a truck, which overcomes the drawbacks of the prior art. In particular the suspension system should enable a more flexible arrangement of the spring and/or damper elements of the suspension system, while at the same time reduce design complexity, structural space, costs, and the number of structural elements.

In a manner known per se, the suspension system according to the invention serves mainly for the elastic suspension of a massive body relative to a substructure, i.e. for example for the suspension of the driver's cabin relative to the vehicle chassis.

In a manner also known per se, the suspension system comprises a spring/damper arrangement with at least one damper element and/or at least one spring element for damping shocks or vibrations, and in addition a Watt linkage arrangement with at least one Watt linkage that connects the massive body and the substructure so that they can move relative to one another. The at least one Watt linkage comprises a Watt link mounted to rotate on a bearing seat of the massive body or of the substructure, and serves to restrict the degree of movement freedom of the massive body relative to the substructure, for example to guide a driver's cabin essentially linearly along the vertical, principal shock direction of the running gear or chassis.

According to the invention, however, the suspension system is characterized in that the at least one spring element and/or the at least one damper element of the spring/damper arrangement is disposed in the area of a Watt linkage between the Watt linkage and the bearing seat associated therewith.

The invention is based on the technical principle that during the spring movements of the massive body (for example of a driver's cabin) relative to the substructure (for example a chassis), there is a rotational movement of the Watt linkage relative to the bearing seat associated with the Watt linkage on the massive body or on the substructure. Accordingly, with a suspension system incorporating a Watt linkage arrangement the spring and/or damper elements, previously always disposed separately between the massive body and the substructure, can be associated directly with one of the Watt links of the Watt linkage arrangement.

Firstly, this has the advantage that no longer in each case do two spring or damper elements have to be provided (for example in the area of the rear corners of a vehicle cabin), but rather, thanks to the invention now only one, central spring or damper element in the area of the respective Watt link suffices to exert the corresponding spring or damping action.

Likewise advantageous, thanks to the invention, are the consequently reduced number of individual components or assemblies, the reduced occupation of structural space, and the lower mass of the suspension system, whereby corresponding cost reductions can also be achieved.

In particular, the invention can be implemented regardless of how the at least one spring element and/or the at least one damper element of the spring/damper arrangement is/are designed and connected to the associated Watt linkage, so long as the spring-movement-induced rotation of the Watt linkage relative to the bearing seat associated therewith leads to a corresponding deflection of the spring element and/or damper element associated with the Watt linkage, and hence to a corresponding elastic or damping counter-force on the Watt linkage.

In a preferred embodiment of the invention however, the spring element or damper element associated with the Watt linkage is in the form of a rotational damper or rotational spring. Construction as a rotational damper or rotational spring brings the particular advantage of an especially space-saving and compact configuration of the suspension system, since the rotational damper or spring can essentially be arranged completely within the area covered by the Watt linkage during its rotational or pivoting movement. Accordingly, in this embodiment of the invention the suspension system takes up particularly little structural space, which is therefore left available for other functions or assemblies.

The invention can also be implemented regardless of whether, in the area of the Watt linkage(s) of the suspension system, a spring element, or damper element, or both a spring and a damper element is/are arranged.

With this background, according to a preferred embodiment of the invention it is first provided that the at least one damper device of the spring/damper arrangement is disposed between a Watt linkage and the bearing seat associated with the Watt linkage, whereas the at least one spring device of the spring/damper arrangement is disposed directly between the massive body and the substructure.

In contrast, an embodiment of the invention alternative to the above envisages that the at least one spring device of the spring/damper arrangement is disposed between a Watt linkage and the bearing seat associated with the Watt linkage, whereas the at least one damper device of the spring/damper arrangement is disposed directly between the massive body and the substructure.

These two embodiments of the invention have in common the advantage that in this way the springing and damping of the massive body or driver's cabin can be realized or arranged separately and at different points. For example, either the damping device can be arranged on a Watt linkage of the suspension system and the spring device directly between the driver's cabin and the substructure, or the spring device is arranged on the Watt linkage while the damper device is positioned directly between the driver's cabin and the substructure. These two embodiments of the invention thus make possible particularly flexible location of the spring device and the damper device, especially when used for a suspension system of a vehicle cabin.

A further, particularly preferred embodiment of the invention provides that the at least one spring device or the at least one damper device is arranged in one of the Watt linkages. In this embodiment the Watt linkage concerned has in addition a housing function, since it accommodates the spring device, e.g., a rotational spring and/or the damping device, e.g., a rotational damper in a corresponding recess of the Watt linkage for example.

A further embodiment of the invention provides that both the at least one spring device and also the at least one damper device of the spring/damper arrangement are disposed between a Watt linkage and the bearing seat associated with the Watt linkage.

In this case the Watt linkage arrangement preferably comprises at least two Watt linkages, such that the at least one spring device is associated with a Watt linkage of the Watt linkage arrangement which is different from that associated with the at least one damper device.

In a further preferred embodiment of the invention the Watt linkage arrangement comprises two Watt linkages whose rectilinear guiding directions correspond, which are arranged a distance apart from one another along the common rectilinear guiding direction, and whose movement planes are parallel.

By virtue of the association of the spring device with one Watt linkage and the damping device with a different Watt linkage, the structural space available is used optimally and both the damping device and the spring device are optimally accessible separately from one another. Furthermore, in this embodiment the spring device and the damping device can each also again be accommodated inside the Watt linkage respectively associated with the spring device or the damping device, and for this the Watt linkages can again be designed like housings.

The embodiment of the invention that comprises two Watt linkages at a distance apart basically has the advantage that in addition to the rectilinear guidance of the massive body or driver's cabin—which can already be realized with a single Watt linkage—rolling movements of the massive body or cabin relative to the chassis can be effectively suppressed without any further auxiliary means. This is related to the fact that Watt linkages arranged a distance apart between the substructure and the massive body can transfer or divert not only transverse forces (as can a single Watt linkage), but by virtue of the distance between the Watt linkages that acts as a lever arm, also torques and in particular rolling torques.

Against this background, in a further and particularly preferred embodiment of the invention it is provided that the outer articulation points associated with the transverse thrust-rods of the two Watt linkages are positioned in respective pairs on a pivot axis common to the two Watt linkages.

In this case the transverse thrust-rods of different Watt linkages, in pairs, are also respectively designed integrally to form a combination strut, in particular with a V-shape. In this way the outer articulation points of the transverse thrust-rods of the two Watt linkages share only two articulation axes, instead of stressing four articulation axes as with two separate Watt linkages.

Furthermore, particularly in the embodiment in which the two transverse thrust-rods articulated together also form a V-shaped component similar to a wishbone, the design is simplified in that the number of components needed, especially the number of hinged joints required, is smaller since only two pivot mountings are needed for connecting the outer articulation points of all four transverse thrust-rods of the two Watt linkages. Thus, in this way there is a saving of structural elements and hence costs. Moreover, this Watt linkage arrangement is compact and space-saving, and for its construction only two connection points to the frame instead of four are needed.

In this arrangement, since the forces produced by the two Watt linkages that act on the frame connection points also partially cancel one another by virtue of vector addition, the frame connection components can be designed lighter and thus more inexpensively than in the case of two Watt linkages with separately articulated transverse thrust-rods. Moreover, if elastomer mountings are used the elastomer mountings can be made less rigid, which promises better body noise insulation. Finally, in this way all the transverse thrust-rods of the two Watt linkages can without problems also be arranged in one and the same movement plane, and this again saves space.

According to a further preferred embodiment of the invention, it is also provided that at least one of the articulation points of the Watt linkage is connected to the massive body or to the substructure so as to allow relative movement. In this case the relative position between the articulation point of the Watt linkage and the massive body can be varied by means of an actuator with an essentially linear action.

This embodiment can be realized regardless of the type of actuator and how it is designed, so long as the forces required for roll stabilization can be exerted by the actuator. For example, the actuator can be a passive, semi-active, or active actuator. A passive actuator, for example and in its simplest form, can be a spring element, a semi-active actuator can for example consist of a hydraulic damper or a gas pressure spring, while an active actuator can for example be in the form of a hydraulic, pneumatic or electric linear actuator.

Particularly in the case of the active variability of the relative position between the at least one articulation points of the Watt linkage and the massive body or the substructure attainable with an active actuator, it is additionally possible to actively counteract undesired rolling of the massive body relative to the substructure since the at least one articulation point of the Watt linkage is displaced by means of the actuator (relative to its connection with the massive body or the substructure).

In other words, this means that the roll angle, for example between the driver's cabin and chassis of a truck, can also be varied actively in order, for example if the chassis tilts to the sides, to maintain the horizontal position of the driver's cabin, or at least to keep the sideways tilt of the driver's cabin smaller than that of the chassis.

In particular this embodiment can be realized regardless of how the at least one actuator is designed and connected to the at least one Watt linkage, so long as a length variation of the actuator leads to a corresponding change of the roll angle of the massive body or cabin relative to the substructure. Thus for example, it is even possible to provide two actuators arranged substantially parallel to the rectilinear guidance direction of the Watt linkage(s).

In a further preferred embodiment the actuator is connected to the articulation point of the Watt linkage by a lever arm. The actuation direction of the actuator is then essentially perpendicular to the rectilinear guiding direction of the at least one Watt linkage.

In this way—depending on the length of the lever arm—torque can be exerted on the articulation of the Watt linkage on which the actuator acts, and thus on the massive body or cabin. Accordingly, by means of this torque applied by the actuator, undesirable rolling movements of the cabin can be actively counteracted.

For example, this embodiment can also be used for roll stabilization when the Watt linkage arrangement of the suspension system comprises only one, and not more than one Watt linkage. In that case the one Watt linkage serves in particular to suppress lateral (translational) movements of the massive body or cabin relative to the substructure. In such a case the actuator connected by a lever arm can be used both for active roll stabilization and also for (approximately) parallel guidance of the massive body or cabin along the movement direction of the sprung suspension.

Furthermore, by virtue of the disposal of the actuation direction of the actuator substantially perpendicularly to the rectilinear guiding direction of the Watt linkage arrangement, optimum de-coupling is achieved between the rectilinear guidance of the Watt linkage—for example the vertical guidance of a truck driver's cabin—on the one hand, and the influencing of the rolling movements of the driver's cabin by the actuator in this case acting essentially in the horizontal direction.

In an embodiment of the invention alternative to the above, the articulation point of the actuator of the Watt linkage arrangement is connected directly to the pivoting point of one of the Watt linkages of the Watt linkage arrangement. In this case the actuation direction of the at least one actuator is at the same time perpendicular to the rectilinear guiding direction of the Watt linkage arrangement.

This embodiment results in a particularly space-saving arrangement and at the same time good lever action of the actuator, along with associated comparatively small forces and correspondingly smaller size in relation to the actuator. This is related to the sometimes considerable distance between the two Watt linkages of the Watt linkage arrangement, which in this embodiment forms the lever arm for the torque produced by the actuator to counteract an external rolling torque on the massive body or driver's cabin.

BRIEF DESCRIPTION OF THE DRAWINGS

Below, the invention is explained in more detail with reference to the drawings that illustrate embodiments intended only as examples, which show.

DETAILED DESCRIPTION OF THE PREFERRED EMBODIMENTS

Figure 1:
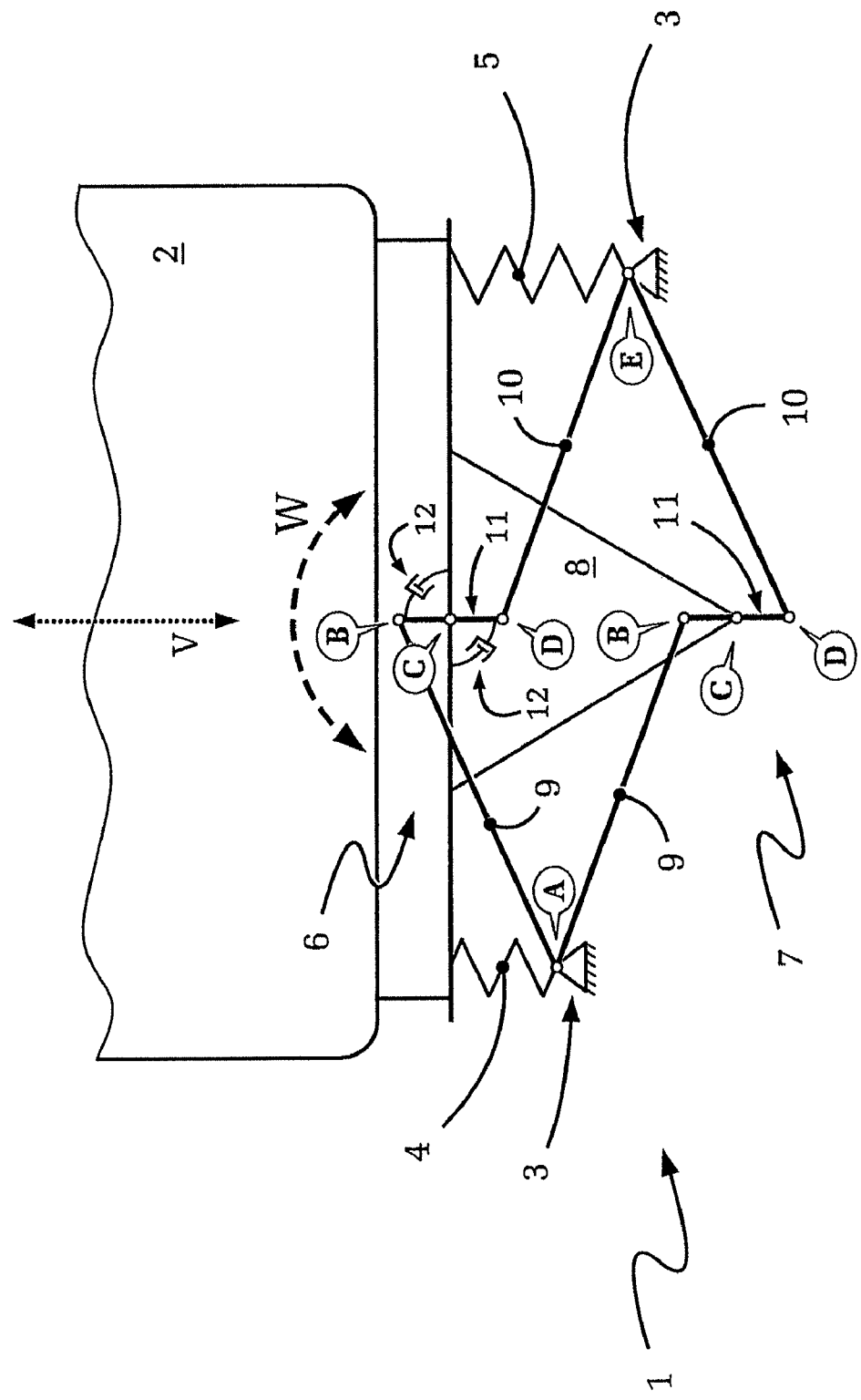
FIG. 1: Represented schematically, an embodiment of a suspension system according to the present invention, with a Watt linkage arrangement and a damper element on a first Watt linkage.

FIG. 1 shows a very schematic representation of an embodiment of a suspension system 1 according to the present invention. The suspension system 1 shown serves for the spring and damped suspension of a truck driver's cabin 2 (particularly in the area of the rear end of the driver's cabin) relative to the chassis 3 of the truck, the latter being indicated schematically in FIG. 1 in the form of suspension points. For the spring suspension of the driver's cabin 2 relative to the chassis 3, in the example embodiment shown two spring elements 4, 5 are arranged between the chassis 3 and the driver's cabin 2.

It can also be seen in FIG. 1 that the suspension system 1 arranged between the driver's cabin 2 and the chassis 3 also comprises, besides the spring elements 4, 5, a Watt linkage arrangement with two Watt linkages 6, 7. It can be seen that each of the Watt linkages 6, 7 has five articulations, indexed in FIG. 1 with the letters A, B, C, D, E. In the embodiment shown, of the articulations A to E those indexed A and E are each mounted attached to the chassis (articulated on the chassis 3), whereas C is mounted attached to the driver's cabin (articulated on the driver's cabin 2). The articulated joint of the pivot point C of the upper Watt linkage 6 is positioned directly on the driver's cabin, whereas the articulated joint of the pivot point C of the lower Watt linkage 7 is connected to the driver's cabin 2 by means of a solid bracket 8. The articulation points A to E of each of the two Watt linkages 6, 7 are respectively connected to one another by an arrangement of two transverse thrust-rods 9, 10 and a central Watt linkage 11.

It can also be seen in FIG. 1 that the two Watt linkages 6, 7 are positioned vertically one above the other. Thus, the respective outer articulation points A, E associated with the transverse thrust-rods 9, 10 of the two Watt linkages 6, 7 are pivotably connected to the chassis 3 as a pair by means of a pivot axis common to the two Watt linkages at A and E.

Compared with a suspension system having two separate Watt linkages, this embodiment, in which the transverse thrust-rods 9, 10 of the Watt linkages 6, 7 are thus articulated as a pair to the chassis on common pivot axes at A and E, constitutes a design simplification because of the omission of two of the otherwise additionally necessary mounting points for the transverse thrust-rods 9, 10, since now only two pivot mountings are needed for connecting the outer articulation points of all four transverse thrust-rods 9, 10 of the two Watt linkages 6, 7. Accordingly, this saves structural elements and hence costs. Moreover, in this way the Watt linkage arrangement 1 can be made compact and space-saving, and in structural terms only two instead of four chassis connections are needed.

Since in this arrangement the forces produced by the two Watt linkages 6, 7 and acting on the frame connection points A, E also partially cancel out by virtue of vector addition, the connections to the chassis can be designed lighter and more inexpensively than in the case of two Watt linkages with respective separately articulated transverse thrust-rods 9, 10. Furthermore, if elastomer mountings are used for the connections to the chassis, elastomer mountings with lower rigidity can be used, which leads to better body noise insulation.

Owing to the particular kinematics—known per se—of the Watt linkages 6, 7 in FIG. 1, mainly lateral transverse movements of the driver's cabin 2 relative to the chassis 3 are now supported, respectively by the articulations A, C and E of the two Watt linkages 6, 7, while the Watt linkages 6, 7 allow unimpeded relative movements V of the driver's cabin 2 and chassis 3 along the vertical axis.

This is related to the fact that the central pivot point C of the respective Watt link 11, by virtue of its forced guiding by the two transverse thrust-rods 9, 10 associated with it (which must have the same length for that purpose and whose outer articulation points A and E must be a vertical distance apart that corresponds to the length of the Watt link 11), cannot depart from its vertical movement path. Consequently, the driver's cabin 2 and the chassis 3 are always held in the vertically centered position one above the other, as illustrated. Thus, thanks to the two Watt linkages 6, 7 transverse movement of the driver's cabin 2 relative to the chassis 3 does not take place, so—at any rate in the area of the Watt linkages 6 and 7, i.e. in this case in the rear area of the driver's cabin 2—no further lateral guiding or support of the driver's cabin 2 is required. The vertical movement between the driver's cabin 2 and the chassis 3 therefore remains completely unimpeded because of the free vertical mobility of the respective Watt linkage 6, 7, and is mainly absorbed or supported only by the two spring devices 4, 5.

Since the central pivot point C of the two Watt links 11 is forcibly guided along the vertical direction, there is in addition a stabilization of the driver's cabin 2 against rotational movements—in other words against any rolling movements W of the type shown in FIG. 1.

In other words this means that in the example embodiments shown in the figures, the driver's cabin 2 can only still undergo the (desired) vertical compensation movements V relative to the chassis 3, but that sideways movements or rotations W of the driver's cabin 2 relative to the chassis 3 are suppressed thanks to the Watt linkage arrangement 6, 7.

In contrast to the prior art, however, in the suspension system 1 according to FIG. 1 the damper device is not positioned together with the spring devices 4, 5 in the area of the sides or corners of the driver's cabin 2. Rather, in the suspension system 1 shown in FIG. 1 the damper device is arranged directly between the Watt link 11 of the upper Watt linkage 6 and the driver's cabin 2, in this case in the form of two schematically indicated damper elements 12.

Since during vertical spring movements V, rotation of the two Watt links 11 about their respective connection points C on the vehicle cabin 2 and on the bracket 8 takes place, such spring movements V also result in a corresponding deflection of the two damper elements 12. In this way, by virtue of the damper elements 12 arranged directly on the Watt link 11, damping of the vertical movements V of the driver's cabin 2 can take place just as effectively as with the spring/damper elements of the prior art arranged in the area of the sides or corners of the driver's cabin 2 at 3, 4.

Compared with the prior art, by arranging the damper elements 12 according to the invention directly in the area of the Watt link 11 space is saved, particularly when rotational dampers are used, as provided according to an embodiment of the invention.

Figure 2:
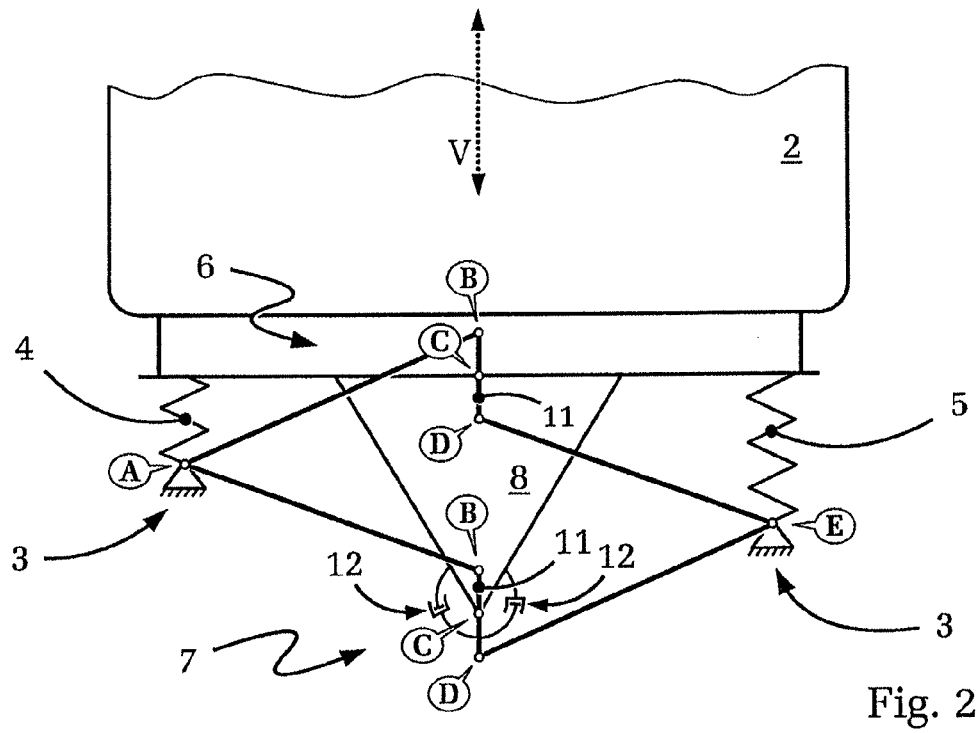
FIG. 2: In a representation corresponding to that of FIG. 1, a view of an embodiment of a suspension system according to the invention with a damper element on a second Watt linkage.

A further embodiment of a suspension system according to the invention is shown in FIG. 2. The embodiment in FIG. 2 differs from the embodiment in FIG. 1 in that the damper device on rotational damper 12 in the embodiment of FIG. 2 is arranged not on the Watt link 11 of the upper Watt linkage 6 but on the Watt link 11 of the lower Watt linkage 7. Since during vertical spring movements V of the driver's cabin 2 the two Watt links 11 rotate or swivel by the same angular amount, the arrangement of the rotational damper 12 on the Watt link 11 of the lower Watt linkage 7 produces the same damping effect as arranging the rotational damper 12 on the Watt link 11 of the upper Watt linkage 6 as in FIG. 1. Thus, it depends on other design considerations whether the rotational damper 12 is arranged on the Watt link 11 of the upper Watt linkage 6 (as in FIG. 1) or on the Watt link 11 of the lower Watt linkage 7 (as in FIG. 2).

The embodiment in FIG. 3 again corresponds mainly to that shown in FIG. 1, particularly so far as concerns the arrangement of the rotational damper 12 on the Watt link 11 of the upper Watt linkage 6.

Figure 3:
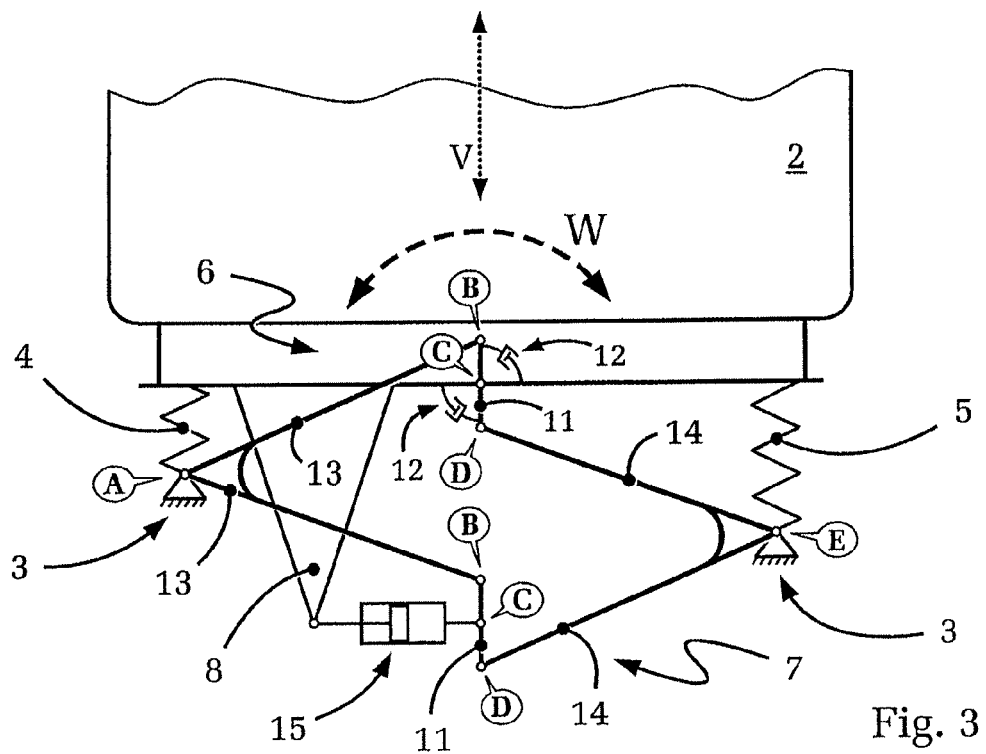
FIG. 3: A representation corresponding to those of FIGS. 1 and 2, showing a view of an embodiment of a suspension system according to the invention with a damper element on an actuator.
Figure 4:
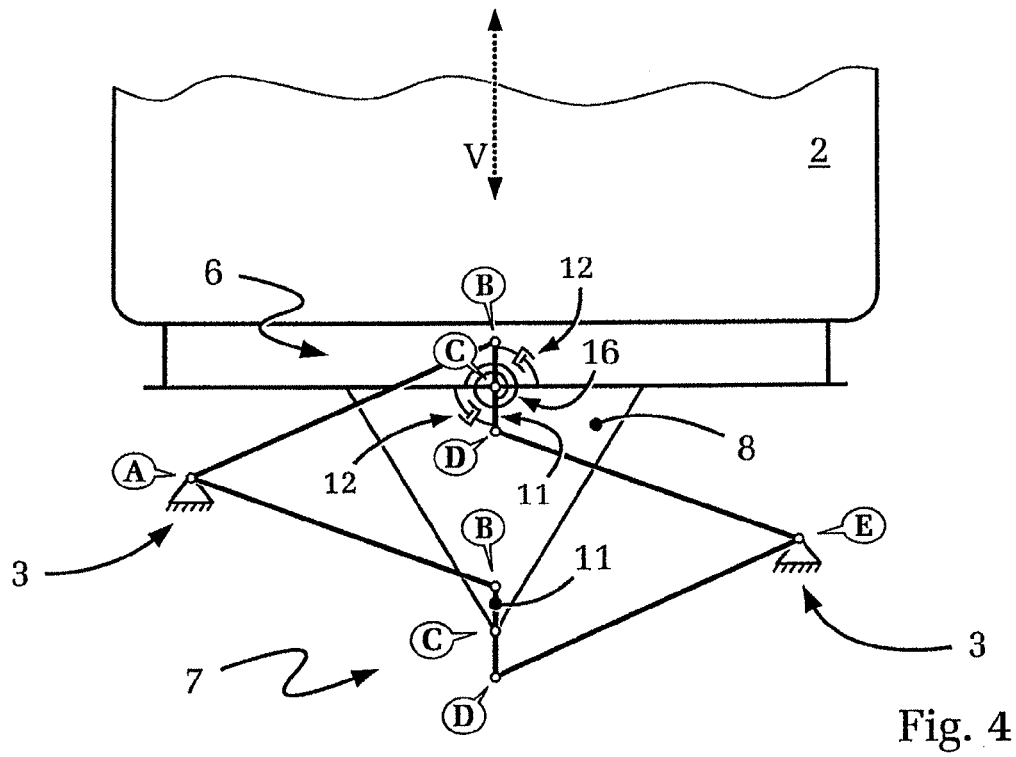
FIG. 4: A representation corresponding to FIGS. 1 to 3, showing a view of an embodiment of a suspension system according to the invention with a spring element and a damper element on the same Watt linkage.

However the embodiment in FIG. 3 differs from that shown in FIG. 1, inasmuch as in the embodiment of FIG. 3 the two transverse thrust-rods 9, 10 of the two Watt linkages 6, 7 which, although in FIGS. 1 and 2 they are articulated on a common pivot axis at A and E, were still previously separate, are now formed integrally as respective combination struts 13 and 14.

This embodiment, in which the previously conjointly articulated transverse thrust-rods 9, 10 (see FIG. 1) now form in each case a V-shaped component similar to a wishbone 13, 14, results in further structural simplifications and additional advantages. First of all, the number of components needed is therefore further reduced. In particular, no longer are four outer pivot bearings needed for the four transverse thrust-rods 9, 10 of the Watt linkages 6, 7, but only two bearings for connecting the outer articulation points A, E of the two V-shaped combination struts 13, 14. Moreover, the two Watt linkages 6, 7 joined in this way can be arranged substantially in one and the same spatial plane (here parallel to the plane of the drawing), which again saves space and makes for greater rigidity. Finally, in this way the tension or compression forces acting within the Watt linkage arrangement also partially cancel out, without these forces first having to detour via the (perhaps elastic) connection to the chassis or driver's cabin.

The slight kinematic stresses that occur during spring movements in this embodiment in the now integral V-shaped combination struts 13, 14 are absorbed without problems by slight elastic deformations of the combination struts 13, 14 during the sprung movement.

Another difference between the embodiment in FIG. 3 and that shown in FIG. 1, is also that in the embodiment shown in FIG. 3 the pivot point C of the Watt link 11 of the lower Watt linkage 7 is not arranged directly on the bracket 8 (compare FIG. 1), but rather, in the FIG. 3 embodiment an actuator 15 is arranged between the bracket 8 and the pivot point C of the Watt link 11 of the lower Watt linkage 7. The actuator 15, which can for example be a hydraulic linear actuator, serves in the FIG. 3 embodiment to actively displace the pivot point C of the Watt link 11 of the lower Watt linkage 7 in the horizontal direction, in order to be able to, in this way, exercise active control of the rolling movements W of the driver's cabin 2 relative to the chassis 3.

By virtue of the possibility, in this embodiment, of varying the relative position between the pivot point C of the lower Watt link 11 and the bracket 8 of the driver's cabin 2, it is possible to counteract undesired rolling W of the driver's cabin 2 relative to the chassis 3, by displacing the pivot point C of the lower Watt link 11 horizontally by means of the actuator.

Likewise, the roll angle W between the massive body and the substructure, i.e. for example between the driver's cabin and the chassis of a truck, can be actively changed in this way so that in the event of lateral chassis inclinations (for example when driving around a curve, driving on inclined ground, or even parking on uneven ground), the horizontal position of the driver's cabin can nevertheless be maintained, or at least the sideways tilt of the driver's cabin can be kept smaller than that of the chassis.

FIGS. 4 to 7 show further example designs for suspension systems according to the present invention. Above all, it can be seen in FIGS. 4 to 7 that—in contrast to the example embodiments shown in FIGS. 1 to 3—in the example embodiments shown in FIGS. 4 to 7 no longer are any spring elements 4, 5 arranged at the sides or corners of the driver's cabin 2. The function of the spring elements 4, 5 in the example embodiments of FIGS. 1 to 3 is instead performed in the example embodiments shown in FIGS. 4 to 7 by a rotational spring or spiral spring 16.

Figure 5:
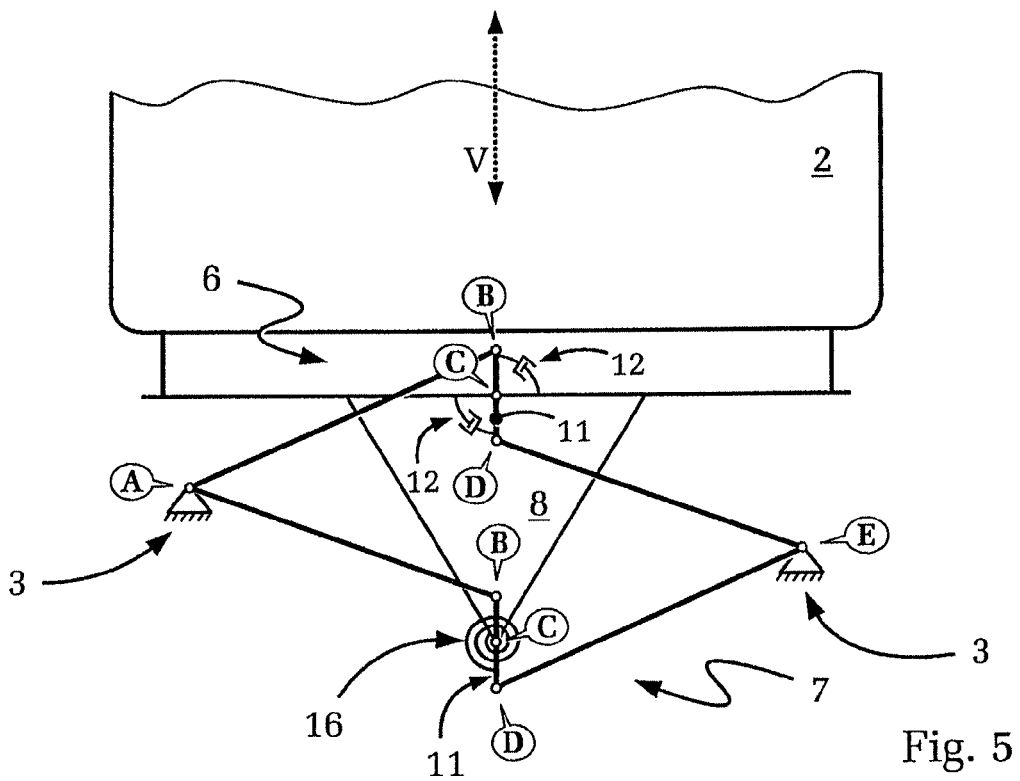
FIG. 5: A representation corresponding to FIGS. 1 to 4, showing a view of an embodiment of a suspension system according to the invention with a spring element and a damper element on different Watt linkages.
Figure 6:
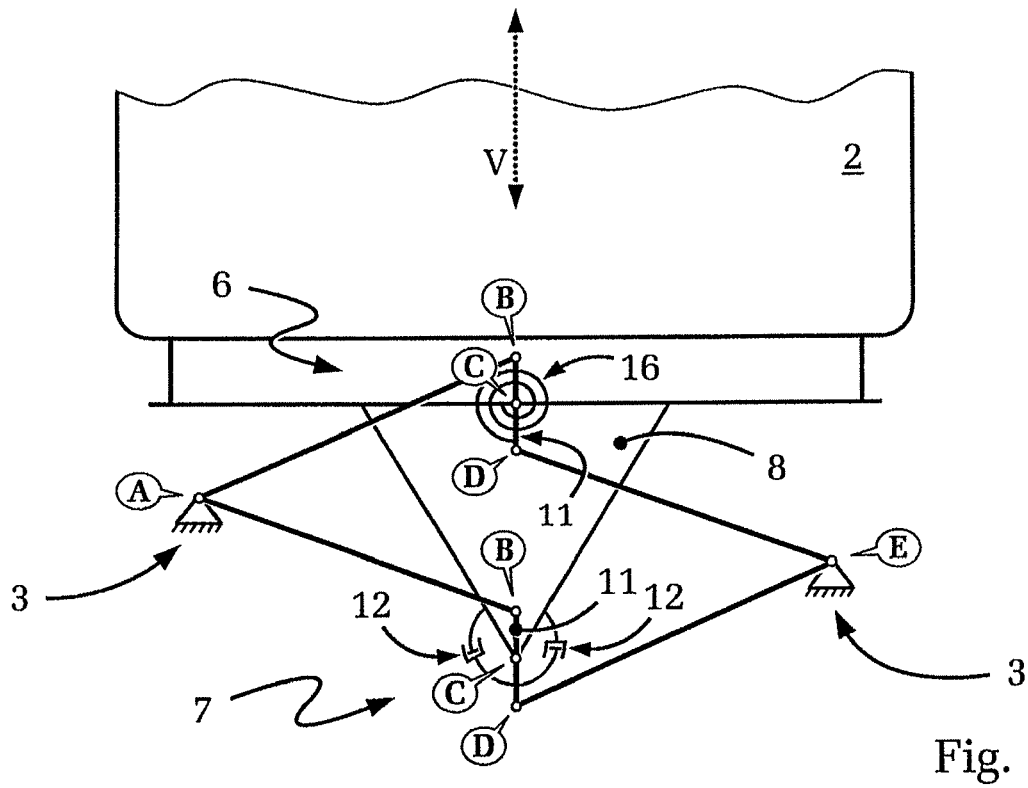
FIG. 6: A representation corresponding to FIGS. 1 to 5, showing a view of an embodiment of a suspension system according to the invention with a spring element and a damper element on different Watt linkages.
Figure 7:
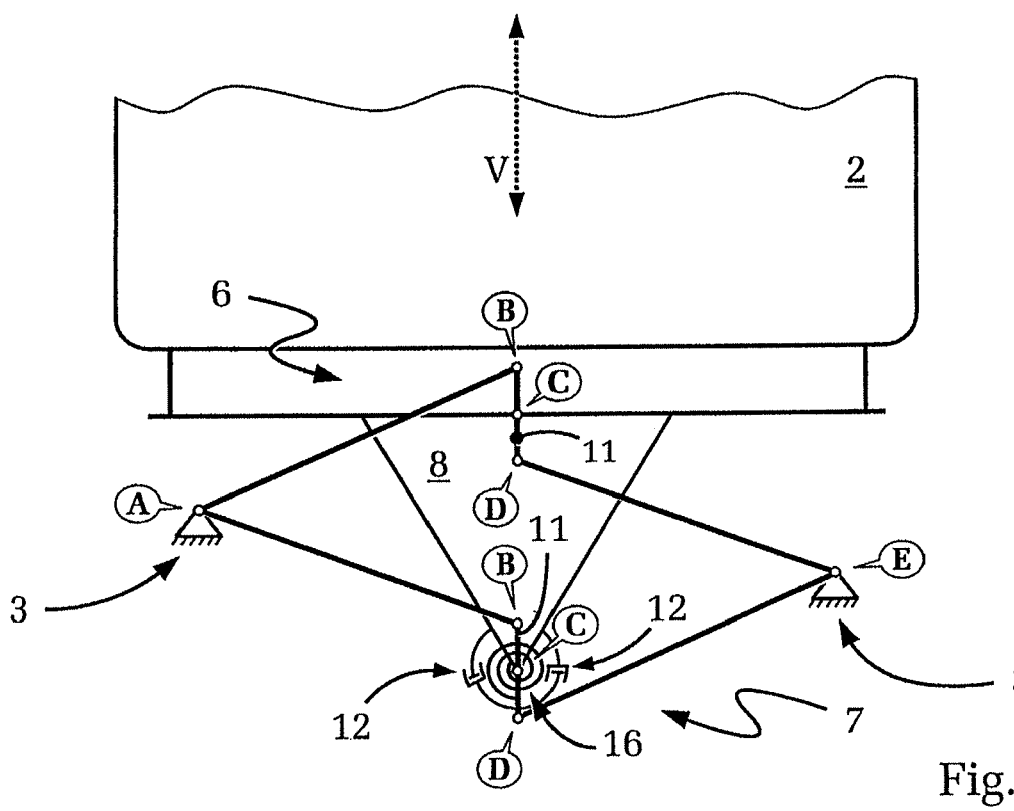
FIG. 7: A representation corresponding to FIGS. 1 to 6, showing as view of an embodiment of a suspension system according to the invention with a spring element and a damper element on the same Watt linkage.

A comparison of FIGS. 4 to 7 shows that the rotational spring 16 can be arranged either in the immediate area of the Watt link 11 of the upper Watt linkage 6 or in the immediate area of the Watt link 11 of the lower Watt linkage 7. In all cases, however, the rotational spring 16 acts directly between the Watt link 11 concerned and its connection, via the pivot point C, to the driver's cabin 2, either directly on the driver's cabin 2 (FIGS. 4 and 6) or on the bracket 8 connected to the driver's cabin 2 (FIGS. 5 and 7).

Since during vertical spring movements V, rotational or pivoting movement of the two Watt links 11 about their respective connection points C to the driver's cabin 2 or to the bracket 8 takes place, the spring movements V also result in corresponding rotational deflection of the spiral or rotational spring 16. In this way therefore, by means of the rotational spring 16 now arranged immediately in the area of the Watt link 11 concerned, the springing of the vertical movements V of the driver's cabin 2 can take place just as well as with the spring elements 4, 5 of the prior art arranged in the area of the sides or corners of the driver's cabin 2 (as in FIGS. 1 to 3).

Thus, compared with the prior art the arrangement of the rotational spring immediately in the area of the Watt link 11 in accordance with the invention also saves a considerable amount of structural space. This is particularly so when both the spring element and the damper element are made in the form of rotational springs 16 and rotational dampers 12, and are arranged on the Watt links 11. FIGS. 4 to 7 show different possible arrangements for the rotational springs 16 and rotational dampers 12. It can be seen that both the rotational spring 16 and the rotational damper 12 can be arranged, largely freely, either at the pivot point C of the Watt link 11 of the upper Watt linkage 6 or at the pivot point C of the Watt link 11 of the lower Watt linkage 7.

It is equally possible (but not illustrated specifically in the example embodiments considered) to arrange a rotational spring 16 and/or a rotational damper 12 both at the pivot point C of the Watt link 11 of the upper Watt linkage 6 and also at the pivot point C of the Watt link 11 of the lower Watt linkage 7. In this way, in particular, higher spring or damper characteristics and/or still smaller dimensions for the rotational springs 16 or rotational dampers 12 can be used. The latter option can be especially important if the rotational springs 16 or rotational damper 12 are to be integrated in the Watt links 11 themselves, so that the Watt links 11 are therefore to be designed at the same time as housings for accommodating the rotational springs 16 or rotational dampers 12.

Consequently, it is clear that thanks to the invention a suspension system for the sprung and/or damping suspension of a massive body such as the driver's cabin of a truck is provided, which makes it possible to arrange the spring and/or damper elements in a particularly flexible manner. The arrangement according to the invention, of the spring and/or damper elements on the Watt links, can be combined with practically any known forms of suspension systems that have Watt linkages—even suspension systems with Watt linkages actively controlled by means of actuators, and basically results in savings of structural complexity, space, the number of structural elements, and thus costs as well.

Accordingly, the invention opens up considerable potential for simplification and development options for suspension systems of the type concerned, particularly in relation to its use in the context of driver's cabin systems for trucks.

LIST OF INDEXES

1 Suspension device
2 Massive body, driver's cabin
3 Substructure, chassis
4, 5 Spring elements
6, 7 Watt linkages
8 Lever arm, bracket
9, 10 Watt linkage transverse thrust rod
11 Watt link
12 Damper element, rotational damper
13, 14 Combination struts
15 Actuator
16 Rotational spring
A, B, C, D, E Watt linkage articulation points

The invention claimed is:

1. A suspension system (1) for a suspension of a massive body (2) relative to a substructure (3), the suspension system (1) comprising:
a suspension arrangement with at least one of a damper element and a spring element for damping shock and vibration,
a Watt linkage arrangement (6, 7) with at least one Watt linkage (A, B, C, D, E) connecting the massive body (2) and the substructure (3) such that the massive body (2) and the substructure (3) move relative to one another, by means of a Watt link (11), to reduce degrees of movement freedom of the massive body (2) relative to the substructure (3), and the Watt link (11) of the at least one Watt linkage (A, B, C, D, E) being mounted pivotably on a bearing seat (C) of either the massive body (2) or the substructure (3), and
the at least one of the spring element (16) and the damper element (12) of the suspension arrangement being disposed in an area of the Watt link (11) between the Watt link (11) and the bearing seat (C) associated with the Watt link (11).

2. The suspension system according to claim 1, wherein the at least one of the spring element and the damper element are at least one of a rotational damper (12) and a rotational spring (16).

3. The suspension system according to claim 1, wherein the suspension arrangement has at least one damper element (12) and the at least one of the damper element (12) of the suspension arrangement is disposed between the Watt link (11) and the bearing seat (C) associated with the Watt link (11), and the at least one of the spring element (4, 5) of the suspension arrangement is disposed directly between the massive body (2) and the substructure (3).

4. The suspension system according to claim 1, wherein the at least one of the spring element (16) of the suspension arrangement is disposed between the Watt link (11) and the bearing seat (C) associated with the Watt link (11), and the at least one of the damper element of the suspension arrangement is disposed directly between the massive body (2) and the substructure (3).

5. The suspension system according to claim 1, wherein the at least one of the spring element (16) and the damper element (12) are arranged in the Watt link.

6. The suspension system according to claim 1, wherein the suspension system comprises at least one of both the spring element (16) and the damper element (12), and both of the spring element (16) and the damper element (12) of the suspension arrangement are disposed between the Watt link (11) and the bearing seat (C) associated with the Watt link (11).

7. The suspension system according to claim 1, wherein the Watt linkage arrangement comprises at least two of the Watt linkages (A, B, C, D, E), and the at least one spring device (16) is associated with a different Watt link (11) of the Watt linkage arrangement from the at least one damper device (12).

8. The suspension system according to claim 1, wherein the Watt linkage arrangement comprises two Watt linkages (A, B, C, D, E), such that rectilinear guiding directions (V) of the at least two Watt linkages (A, B, C, D, E) are the same, the two Watt linkages (A, B, C, D, E) are disposed spaced apart along a common rectilinear guiding direction (V), and movement planes of the two Watt linkages (A, B, C, D, E) are parallel to one another.

9. The suspension system according to claim 8, wherein outer articulation points (A, E) associated with transverse thrust-rods (9, 10) of the two Watt linkages (A, B, C, D, E) are positioned as a pair on a pivot axis (A, E) common to the two Watt linkages (A, B, C, D, E).

10. The suspension system according to claim 9, wherein the transverse thrust-rods (9, 10) of the two Watt linkages (A, B, C, D, E) are configured integrally in pairs forming a substantially V-shaped combination strut (13, 14).

11. The suspension system according to claim 1, wherein at least one articulation point (A, C, E) of the at least one Watt linkage (A, B, C, D, E) is connected and movable relative to either the massive body (2) or the substructure (3), and a relative position between the at least one articulation point (A, C, E) and either the massive body (2) or the substructure (3) is varied by at least one actuator (15).

12. The suspension system according to claim 11, wherein an actuation direction of the actuator (15) is substantially perpendicular to a rectilinear guiding direction (V) of the at least one Watt linkage (A, B, C, D, E), and the actuator (15) is connected to the articulation point (A, C, E) of the Watt linkage by a lever arm (8).

13. The suspension system according to claim 11, wherein the articulation point (C) of the actuator (15) to the Watt linkage arrangement (A, B, C, D, E) is connected directly to the bearing seat (C) of one of the Watt links (11) of the Watt linkage arrangement (A, B, C, D, E), and an actuation direction of the actuator (15) is substantially perpendicular to a rectilinear guiding direction (V) of the Watt linkage arrangement (A, B, C, D, E).

14. A suspension system (1) for damping movement of a driver cabin (2) relative to a chassis (3) of the vehicle, the suspension system (1) comprising:
two Watts linkages (6, 7), each of the Watts linkages (6, 7) comprises first and second thrust rods (9, 10) and a central Watts link (11), one end of the central Watts links (11) is coupled to an end of a respective one of the first thrust rods (9) and an opposite end of the central Watts links (11) is coupled to an end of a respective one of the second thrust rods (10), opposite ends of the first thrust rods (9) are pivotably coupled to a first connection point (A) of the chassis (3) and opposite ends of the second thrust rods (10) are pivotably coupled to a second connection point (E) of the chassis (3);
a bracket (8) is fixed to the driver cabin (2) and a central point (C) of a first of the central Watts links (11) is pivotably coupled to the bracket (8) at a vertical distance from the driver cabin (2);

a first spring element (4) is fixed to the first connection point (A) of the chassis (3) and to a point of the driver cabin (2) and a second spring element (5) is fixed to the second connection point (E) of the chassis (3) and to another point of the driver cabin (2) such that the first and the second spring elements (4, 5) suppress relative vertical movement between the driver cabin (2) and the chassis (3); and a damper element (12) is fixed to the driver cabin (2) and a central point (C) of a second of the central Watts links (11) is pivotably coupled to the damper element (12) such that the damper element (12) dampens rotational movement of the second of the central Watts links (11) about the associated central point (C) and the relative vertical movement between the driver cabin (2) and the chassis (3).

* * * * *